US012047105B2

(12) United States Patent
Ryan

(10) Patent No.: US 12,047,105 B2
(45) Date of Patent: Jul. 23, 2024

(54) APPARATUS AND METHODS FOR DC-OFFSET ESTIMATION

(71) Applicant: Nordic Semiconductor ASA, Trondheim (NO)

(72) Inventor: Daniel James Ryan, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 206 days.

(21) Appl. No.: 17/615,051

(22) PCT Filed: May 28, 2020

(86) PCT No.: PCT/EP2020/064919
§ 371 (c)(1),
(2) Date: Nov. 29, 2021

(87) PCT Pub. No.: WO2020/239956
PCT Pub. Date: Dec. 3, 2020

(65) Prior Publication Data
US 2022/0231717 A1 Jul. 21, 2022

(30) Foreign Application Priority Data
May 31, 2019 (GB) .................................... 1907717

(51) Int. Cl.
*H04B 1/30* (2006.01)
(52) U.S. Cl.
CPC ......... *H04B 1/30* (2013.01); *H04B 2001/305* (2013.01)
(58) Field of Classification Search
CPC ............... H04L 27/0014; H04L 27/142; H04L 2027/0044; H04L 2027/03;
(Continued)

(56) References Cited

U.S. PATENT DOCUMENTS 5,241,702 A * 8/1993 Dent ........................ H04B 1/30
455/278.1
5,828,955 A * 10/1998 Lipowski ............... H03D 3/008
375/329

(Continued)

FOREIGN PATENT DOCUMENTS

EP   0 474 615 A2   9/1991
GB   2 424 326 A    9/2006

OTHER PUBLICATIONS

Chernov et al., "Least squares fitting of circles," *Department of Mathematics, University of Alabama at Birmingham*, White paper, Nov. 2008, 23 pages.

(Continued)

*Primary Examiner* — James M Perez
(74) *Attorney, Agent, or Firm* — Klarquist Sparkman, LLP

(57) ABSTRACT

A radio system comprises a radio transmitter apparatus and a radio receiver apparatus. The radio transmitter apparatus is configured to transmit a continuous-wave radio-frequency signal having a first frequency. The radio receiver apparatus comprises: an antenna for receiving the continuous-wave radio-frequency signal; a local oscillator for generating a periodic signal at a second frequency which differs from the first frequency by a frequency offset; a mixer for mixing the received continuous-wave radio-frequency signal with the periodic signal to generate a down-mixed signal; and a processor or other circuitry configured to generate frequency-offset data from the down-mixed signal, wherein the frequency-offset data is representative of an estimate of the frequency offset. The processor or other circuitry is configured to use the frequency-offset data to generate DC-offset data representative of an estimate of a DC offset component of the down-mixed signal.

18 Claims, 3 Drawing Sheets

(58) Field of Classification Search
CPC ............. H04L 2027/0067; H04L 27/38; H04L 27/3845; H04L 27/3854; H04L 27/2647; H04L 27/2655; H04L 27/2657; H04L 27/2659; H03D 3/007; H03D 3/008; H03D 2200/47; H04B 1/30; H04B 2001/305
See application file for complete search history.

(56) References Cited

U.S. PATENT DOCUMENTS

| | | | | |
|---|---|---|---|---|
| 6,327,313 | B1* | 12/2001 | Traylor | H04L 25/063 375/316 |
| 6,370,205 | B1* | 4/2002 | Lindoff | H04L 25/0242 455/305 |
| 7,558,556 | B1* | 7/2009 | Moloudi | H04B 1/40 327/267 |
| 7,733,949 | B2* | 6/2010 | Jin | H04B 17/354 379/3 |
| 8,218,686 | B1* | 7/2012 | Timofeev | H04L 25/062 327/307 |
| 8,542,784 | B2* | 9/2013 | Etemadi | H04L 27/0014 375/319 |
| 8,548,096 | B2* | 10/2013 | Park | H04L 27/0014 375/326 |
| 8,665,938 | B2* | 3/2014 | Yu | H04B 17/14 375/228 |
| 8,842,779 | B2* | 9/2014 | Park | H04L 27/2659 375/326 |
| 9,077,603 | B2* | 7/2015 | Park | H04L 27/2659 |
| 9,100,080 | B2* | 8/2015 | Wichlund | H04B 1/12 |
| 9,231,637 | B2* | 1/2016 | Li | H04B 1/30 |
| 9,413,574 | B1* | 8/2016 | Timofeev | H04L 25/061 |
| 9,444,661 | B2* | 9/2016 | Waheed | H04L 25/067 |
| 9,515,812 | B2* | 12/2016 | Hjerto | G06F 5/06 |
| 9,614,557 | B1* | 4/2017 | Mayer | H04B 1/40 |
| 9,847,809 | B2* | 12/2017 | Engelien-Lopes | H04B 1/7087 |
| 9,888,496 | B1* | 2/2018 | Zheng | H04L 27/2666 |
| 9,942,070 | B2* | 4/2018 | Engelien-Lopes | H04L 27/2662 |
| 10,079,647 | B2* | 9/2018 | Waheed | H03G 3/3078 |
| 10,348,539 | B1* | 7/2019 | Midha | H04L 27/16 |
| 10,374,838 | B2* | 8/2019 | Jiang | H03F 3/245 |
| 10,686,489 | B2* | 6/2020 | Olsen | H04B 1/70752 |
| 10,764,097 | B1* | 9/2020 | Rey | H04L 27/144 |
| 10,855,499 | B2* | 12/2020 | Olsen | H04L 27/00 |
| 10,972,315 | B2* | 4/2021 | Nissilä | H04B 17/318 |
| 11,146,432 | B2* | 10/2021 | Tapaninen | H04L 27/0014 |
| 11,228,471 | B2* | 1/2022 | Li | H04L 27/0008 |
| 11,556,298 | B1* | 1/2023 | Seger, Jr. | G06F 3/0446 |
| 2002/0081990 | A1* | 6/2002 | Asikainen | H03D 3/008 455/326 |
| 2002/0132597 | A1* | 9/2002 | Peterzell | H03D 3/009 455/67.11 |
| 2003/0133518 | A1* | 7/2003 | Koomullil | H04L 27/0014 375/326 |
| 2003/0171110 | A1* | 9/2003 | Shi | H04B 1/406 455/324 |
| 2003/0206603 | A1* | 11/2003 | Husted | H04L 27/3863 375/324 |
| 2005/0153676 | A1* | 7/2005 | Ruelke | H03D 3/008 455/324 |
| 2005/0221783 | A1* | 10/2005 | Pan | H04B 1/123 455/302 |
| 2005/0276358 | A1* | 12/2005 | Pipilos | H04L 27/36 375/345 |
| 2006/0034356 | A1* | 2/2006 | Fechtel | H03D 3/008 375/219 |
| 2006/0094377 | A1* | 5/2006 | Pan | H03D 7/1458 455/127.1 |
| 2006/0178165 | A1* | 8/2006 | Vassiliou | H04B 1/30 455/132 |
| 2007/0097271 | A1* | 5/2007 | Gao | H04B 1/123 348/724 |
| 2007/0280379 | A1* | 12/2007 | Wong | H04L 25/06 375/332 |
| 2008/0032660 | A1* | 2/2008 | Clark | H04B 1/30 455/323 |
| 2008/0089443 | A1* | 4/2008 | Sanada | H04L 27/2675 375/319 |
| 2009/0227214 | A1* | 9/2009 | Georgantas | H04B 1/30 455/86 |
| 2011/0007847 | A1* | 1/2011 | O'Keeffe | H04L 25/062 375/319 |
| 2012/0170629 | A1* | 7/2012 | Park | H04L 27/2659 375/224 |
| 2012/0200348 | A1* | 8/2012 | Mulvaney | H03D 3/007 329/323 |
| 2013/0343492 | A1* | 12/2013 | Park | H04L 27/28 375/340 |
| 2014/0171007 | A1* | 6/2014 | Nentwig | H04B 1/10 455/317 |
| 2014/0171008 | A1* | 6/2014 | Nentwig | H03D 7/1458 455/323 |
| 2014/0334573 | A1* | 11/2014 | Wichlund | H04L 27/364 375/316 |
| 2014/0348272 | A1* | 11/2014 | Park | H04L 27/2659 375/340 |
| 2015/0139373 | A1* | 5/2015 | Hjerto | G06F 5/06 375/354 |
| 2015/0219751 | A1* | 8/2015 | Ebling | G01S 7/354 342/175 |
| 2015/0346332 | A1* | 12/2015 | Taylor, Jr. | G01S 13/84 342/458 |
| 2015/0365118 | A1* | 12/2015 | Khan | H03G 3/3068 375/345 |
| 2015/0365128 | A1* | 12/2015 | Choo | H03D 3/008 455/79 |
| 2016/0094379 | A1* | 3/2016 | Grasso | H04L 27/3836 375/320 |
| 2016/0178744 | A1* | 6/2016 | Kluge | H04W 24/00 342/458 |
| 2016/0211872 | A1* | 7/2016 | Sim | H04B 1/1027 |
| 2016/0218893 | A1* | 7/2016 | Waheed | H04L 25/067 |
| 2016/0285667 | A1* | 9/2016 | Deng | H04L 27/2666 |
| 2016/0315656 | A1* | 10/2016 | Engelien-Lopes | H04W 4/80 |
| 2016/0359614 | A1* | 12/2016 | Hao | H04L 7/0087 |
| 2017/0078125 | A1* | 3/2017 | Engelien-Lopes | H04L 27/2659 |
| 2017/0181097 | A1* | 6/2017 | Ganesan | H04L 1/0045 |
| 2017/0331652 | A1* | 11/2017 | van den Heuvel | H04L 27/148 |
| 2018/0270008 | A1* | 9/2018 | Yi | H04W 4/80 |
| 2018/0294828 | A1* | 10/2018 | Matsui | H04B 1/1638 |
| 2018/0338321 | A1* | 11/2018 | Shepard | H04W 68/02 |
| 2018/0367184 | A1* | 12/2018 | Olsen | H04B 1/70735 |
| 2019/0020310 | A1* | 1/2019 | Modi | H03D 7/165 |
| 2019/0158335 | A1* | 5/2019 | Stanciu | H04L 27/2657 |
| 2019/0187263 | A1* | 6/2019 | Romme | G01S 11/06 |
| 2019/0349228 | A1* | 11/2019 | Olsen | H04L 27/22 |
| 2020/0084068 | A1* | 3/2020 | Beidas | H04B 1/0475 |
| 2020/0313716 | A1* | 10/2020 | Bhat | H04B 1/123 |
| 2020/0336339 | A1* | 10/2020 | Nissilä | H04B 17/318 |
| 2020/0351132 | A1* | 11/2020 | Li | H04L 27/22 |
| 2021/0234735 | A1* | 7/2021 | Tapaninen | H04L 27/0014 |
| 2022/0171047 | A1* | 6/2022 | Ryan | G01S 13/24 |
| 2022/0173756 | A1* | 6/2022 | Wu | H04B 1/0014 |
| 2022/0173945 | A1* | 6/2022 | Li | H04L 27/0014 |
| 2022/0173946 | A1* | 6/2022 | Wu | H03L 7/23 |
| 2022/0209873 | A1* | 6/2022 | Ryan | H04B 17/104 |
| 2022/0231717 | A1* | 7/2022 | Ryan | G01S 13/84 |
| 2022/0377690 | A1* | 11/2022 | Li | H04W 56/003 |
| 2023/0291512 | A1* | 9/2023 | Murakami | H04L 5/0048 |
| 2023/0308324 | A1* | 9/2023 | Ryan | H04L 27/2017 |

OTHER PUBLICATIONS

Inamori et al., "Frequency Offset Estimation Scheme in the Presence of Time-Varying DC Offset for OFDM Direct Conversion Receivers," *IEICE Transactions on Communications*, vol. E90B, No. 10, Oct. 2007, pp. 2884-2890.

(56) References Cited

OTHER PUBLICATIONS

International Search Report and Written Opinion for PCT/EP2020/064919, mailed Aug. 19, 2020, 15 pages.

IPO Search Report under Section 17(5) for Application No. GB1907717.1, mailed Dec. 18, 2019, 3 pages.

Kay, "A Fast and Accurate Single Frequency Estimator," *IEEE Transactions on Acoustics, Speech, and Signal Processing*, vol. 37, No. 12, Dec. 1989, pp. 1987-1990.

Kim et al., "DC-offset Estimation of Multiple CW Micro Doppler Radar," *26th European Signal Processing Conference*, Sep. 2018, pp. 2414-2418.

McKilliam et al., "Frequency Estimation by Phase Unwrapping," *IEEE Transactions on Signal Processing*, vol. 58, No. 6, Jun. 2010, pp. 2953-2963.

Park et al., "Arctangent Demodulation With DC Offset Compensation in Quadrature Doppler Radar Receiver Systems," *IEEE Transactions on Microwave Theory and Techniques*, vol. 55, No. 5, May 2007, pp. 1073-1079.

Park et al., "Measurement Method for Imbalance Factors in Direct-Conversion Quadrature Radar Systems," *IEEE Microwave and Wireless Components Letters*, vol. 17, No. 5, May 2007, pp. 403-405.

Sohn et al., "Data-Aided Approach to I/Q Mismatch and DC Offset Compensation in Communication Receivers," *IEEE Communications Letters*, vol. 6, No. 12, Dec. 2002, pp. 547-549.

Yuen et al., "A novel method for parameter estimation of digital arc," *Pattern Recognition Letters 17*, Apr. 1996, pp. 929-938.

Zakrzewski et al., "Comparison of Center Estimation Algorithms for Hearth and Respiration Monitoring with Microwave Doppler Radar," *IEEE Sensors Journal*, vol. 12, No. 3, Mar. 2012, pp. 627-634.

Zand et al., "A high-accuracy phase-based ranging solution with Bluetooth Low Energy (BLE)," *2019 IEEE Wireless Communications and Networking Conference (WCNC)*, Apr. 15, 2019, pp. 1-8.

\* cited by examiner

APPARATUS AND METHODS FOR DC-OFFSET ESTIMATION

CROSS REFERENCE TO RELATED APPLICATIONS

This is the U.S. National Stage of International Application No. PCT/EP2020/064919, filed May 28, 2020, which was published in English under PCT Article 21(2), which in turn claims the benefit of Great Britain Application No. 1907717.1, filed May 31, 2019.

BACKGROUND OF THE INVENTION

This invention relates to radio apparatus and methods for estimating a DC offset component in a down-mixed radio-frequency signal.

Radio receivers typically use a heterodyne architecture or a direct-conversion architecture. Heterodyne receivers mix a received radio signal with a locally-generated periodic signal that is offset from the carrier frequency of the received signal by an intermediate-frequency offset to generate a down-mixed signal centred on the intermediate frequency (IF). The mixing may be performed in the analog or digital domain. Direct-conversion receivers, also known as zero-IF receivers, instead mix a received signal with a local-oscillator signal that is substantially equal to the carrier frequency so that the received signal is shifted directly to baseband.

A challenge with direct conversion receivers is that the local oscillator (LO) signal commonly leaks into the radio-frequency port of the mixer input, where it self-mixes to produce a direct-current (DC) offset in the mixer output. The signal can also leak through the receiver's low noise amplifier (LNA) where it can be amplified. Additionally, the LO may leak to the environment and reflect back to the antenna, creating a time-varying offset. A DC offset may also be present due to internal offsets in the receiver circuitry of a device, that may exhibit variation due to process, voltage and/or temperature (PVT). A strong incoming interfering signal may also couple with the LO port of the mixer. These factors may all contribute to a DC offset that may be of a substantially higher amplitude than the received signal, which can make it difficult to process the baseband signal reliably.

DC offsets may also be exhibited on the radio transmitter. These can be caused by DC offsets within the baseband path of the radio, or due to LO leakage to the output of the mixer or later stages. The DC offset can therefore vary from device to device, and vary in time, on both sides of a wireless link.

Known zero-IF receivers seek to compensate for DC offset using techniques such as high-pass filtering or applying a correction signal in the analog domain. Analog solutions includes applying an offset cancellation signal at one or more points in the receive chain. However, this is complex and may require regular calibration, e.g., to cope with temperature changes.

In some situations it can be desirable to compensate for a DC offset when receiving a continuous-wave (CW) signal (e.g., a pure, unmodulated sine-wave carrier). One exemplary situation is when performing phase-based ranging to measure the distance between a radio transmitter and a radio receiver. In such cases, approaches that rely on receiving coded information, such as training symbols, or that require information to be encoded across a channel width, are not appropriate. When using a zero-IF receiver to receive a continuous-wave signal of the same frequency as the LO, the DC offset and the down-mixed received signal will be indistinguishable, as both are simply constant outputs. Using a high-pass filter is not possible as this would remove the desired signal.

A naïve approach to addressing this problem could be to measure the DC offset during a period of radio silence—i.e. when there is no incoming radio signal at the carrier frequency—and then to use the same measured DC offset value to compensate for DC offset in a later-received continuous-wave signal. However, this approach is not robust. First, it can be difficult to ensure that there is no incoming radio signal at the carrier frequency when calibrating the DC offset—for instance, even when the power amplifier of the associated radio transmitter is disabled, the transmitter device may still generate a periodic signal that leaks through its antenna and is received by the radio receiver. Secondly, the approach is not reliable in the presence of interference, or if the transmitter device changes the transmission power between the calibration and reception phases, or if the receiver device changes its amplification between the calibration and reception phases (e.g. by the action of an automatic gain control).

The present invention seeks to provide a more robust approach to compensating for DC offset when receiving a continuous-wave radio-frequency signal.

SUMMARY OF THE INVENTION

From a first aspect, the invention provides a radio-frequency reception method comprising:
  receiving a continuous-wave radio-frequency signal having a first frequency;
  generating a periodic signal at a second frequency which differs from the first frequency by a frequency offset;
  mixing the received radio-frequency signal with the periodic signal to generate a down-mixed signal;
  processing the down-mixed signal to generate frequency-offset data representative of an estimate of the frequency offset; and
  using the frequency-offset data to generate DC-offset data representative of an estimate of a DC offset component of the down-mixed signal.

From a second aspect, the invention provides a radio receiver apparatus comprising:
  an electrical input for receiving a continuous-wave radio-frequency signal having a first frequency;
  a local oscillator for generating a periodic signal at a second frequency which differs from the first frequency by a frequency offset;
  a mixer for mixing the received continuous-wave radio-frequency signal with the periodic signal to generate a down-mixed signal; and
  a processor or other circuitry configured to generate frequency-offset data from the down-mixed signal, wherein the frequency-offset data is representative of an estimate of the frequency offset, and configured to use the frequency-offset data to generate DC-offset data representative of an estimate of a DC offset component of the down-mixed signal.

From a third aspect, the invention provides a radio system comprising a radio transmitter apparatus and a radio receiver apparatus, wherein the radio transmitter apparatus is configured to transmit a continuous-wave radio-frequency signal having a first frequency, and wherein the radio receiver apparatus comprises:
  an antenna for receiving the continuous-wave radio-frequency signal;

a local oscillator for generating a periodic signal at a second frequency which differs from the first frequency by a frequency offset;

a mixer for mixing the received continuous-wave radio-frequency signal with the periodic signal to generate a down-mixed signal; and a processor or other circuitry configured to generate frequency-offset data from the down-mixed signal, wherein the frequency-offset data is representative of an estimate of the frequency offset, and configured to use the frequency-offset data to generate DC-offset data representative of an estimate of a DC offset component of the down-mixed signal.

Thus it will be seen that, in accordance with the invention, instead of using a zero-IF receiver to receive the continuous-wave signal, the continuous-wave signal is mixed with a local-oscillator signal that is offset by a frequency offset.

The frequency offset preferably comprises a predetermined intermediate-frequency component, which may be engineered by design. It may also comprise an error component—e.g., due to imperfect matching of the transmitter and receiver oscillator frequencies, or due to Doppler shift caused by relative movement of the transmitter and receiver.

Once the frequency offset has been estimated, this estimate is then used to estimate a DC offset in the mixed signal. This contrasts with the naïve approach described above, in which a DC offset is measured when no radio signal has been received.

The estimated DC offset may be used to adjust a received radio signal, or to modify sample data representing a received radio signal—e.g. to compensate for a DC offset component in a down-mixed received signal. In a preferred set of embodiments, this is the same down-mixed continuous-wave radio signal, but in other embodiments it may be a later-received down-mixed radio signal (which may be another continuous-wave signal, or which may carry modulated information).

Estimating the DC offset in this way allows a receiver to reduce or remove the DC offset in a continuous-wave signal, and therefore to sample a continuous-wave signal accurately even when heterodyning the received signal with a very small intermediate frequency (e.g. where the frequency offset is of the order of 10 kHz), where DC offset would typically make this very difficult. The radio receiver may be configured to subtract the DC offset component from the received down-mixed signal.

The use of a very small frequency offset may be advantageous in certain situations, such as when performing phase-based ranging. In particular, if the frequency offset is sufficiently small, the inventors have realised that it can be possible to perform phase-based ranging with acceptable accuracy without having to synchronise the transmitter and the receiver apparatuses.

Thus, the frequency offset is preferably less than 100 kHz, and may be less than 50 kHz or 20 kHz. However, the frequency offset is preferably greater than 1 kHz or 5 kHz. In some embodiments, it is in the range 5 kHz to 100 kHz—e.g., around 10 kHz.

By measuring the DC offset simultaneously with receiving the continuous-wave signal (rather than measuring it separately in a period of radio silence) the challenges of ensuring radio silence and dealing with interference, mentioned above, can be avoided. Moreover, the reception process can be performed quicker, which may be desirable in and of itself. A fast estimation of DC offset may also reduce the risks of errors arising due to time-varying effects, such as through the action of an automatic gain control (AGC) in the receiver, or due to the transmitter changing its transmission power, or because of changing channel conditions.

The continuous-wave radio-frequency (RF) signal may be a sine wave signal. The radio-frequency signal is preferably a radio signal—e.g., received through a radio antenna. However, in some embodiments the RF signal could be received over a wired link, such as a coaxial cable. References herein to a "radio signal", "radio receiver", "radio transmitter", etc. should be understood as encompassing communications purely over wired links.

The radio-frequency signal may be of any duration. However, the applicant has recognised that, at least in some embodiments, estimating the DC offset based on a frequency-offset estimate can allow the DC offset to be estimated, with acceptable accuracy, within one full cycle period of the down-mixed signal, or less. Thus, in some embodiments, at most one cycle period of the down-mixed signal is processed to generate the frequency-offset data and/or the DC-offset data—e.g., at most half a cycle, or at most a quarter cycle, of the down-mixed signal.

As already noted, the frequency offset may comprise a predetermined frequency offset component (i.e., an offset component that is intentional) and may additionally comprise an error offset component. The transmitter and receiver apparatuses may comprise respective crystal oscillators that have respective nominal oscillator frequencies (which may be the same). The transmitter and receiver apparatuses may comprise respective local oscillator circuitry configured to derive the first and second frequencies from the crystal oscillators (e.g., using frequency-divider, frequency-multiplier and/or phase-locked-loop circuitry) such that there is a predetermined, non-zero frequency offset when the crystal oscillators are operating at their nominal oscillator frequencies. This predetermined frequency offset may be less than 100 kHz, 50 kHz or 20 kHz. In some embodiments, it is in the range 5 kHz to 20 kHz—e.g., around 10 kHz.

The predetermined frequency offset component may be selected to be larger than an expected error offset component, so as to ensure that there will always be a non-zero offset. For example, an error offset may be simulated or measured or calculated as being less than +/−5 kHz. The intentional IF offset may then be set as low as 10 kHz in this scenario. Increasing the predetermined frequency offset can result in higher accuracy, but places a greater requirement on the linearity of the tuning of the local oscillator frequency.

The radio transmitter and/or receiver apparatus may be configured to determine a distance between the transmitter apparatus and the receiver apparatus (e.g. to generate data representative of the distance). The distance may be estimated from the down-mixed signal using the DC-offset data—e.g., by processing the down-mixed signal after compensating the down-mixed signal for the estimated DC offset component.

The receiver apparatus may estimate a phase difference between the received continuous-wave radio-frequency signal and the generated periodic signal. It may generate phase-difference data representative of the phase difference. The estimated phase difference may be used when estimating a distance between the transmitter apparatus and the receiver apparatus.

Advantageously, a common portion of the down-mixed signal (e.g. a common set of complex sample values) may be used both for estimating the DC offset and for determining the distance between the transmitter and receiver apparatuses. The phase difference between the received continuous-wave radio-frequency signal and the generated periodic signal may be estimated from this common portion. In this way, the effects of any time-dependent interference are minimised. This approach also allows the phase difference and/or distance to be estimated more rapidly.

The radio receiver apparatus may be further configured to transmit a second continuous-wave radio-frequency signal having the second frequency. It may generate this second signal by amplifying an output of its local oscillator. The radio transmitter apparatus may comprise:

an antenna for receiving the second continuous-wave radio-frequency signal;

a local oscillator for generating a second periodic signal at the first frequency;

a mixer for mixing the received second continuous-wave radio-frequency signal with the second periodic signal to generate a second down-mixed signal; and a processor or other circuitry configured to generate second frequency-offset data from the second down-mixed signal, wherein the second frequency-offset data is representative of an estimate of the frequency offset, and configured to use the second frequency-offset data to generate second DC-offset data representative of an estimate of a DC offset component of the second down-mixed signal.

The radio transmitter apparatus may estimate a second phase difference, between the received second continuous-wave radio-frequency signal and the generated second periodic signal. The radio receiver may be configured to transmit data representative of the first phase difference to the radio transmitter apparatus, or may be configured to receive data representative of the second phase difference from the radio transmitter apparatus. One or both of the radio transmitter and the radio receiver may comprise a processor or other circuitry configured to calculate an estimate of the distance from the first and second phase differences.

In order to measure distances greater than one wavelength, the system may be further configured to determine a third phase difference for a continuous-wave radio-frequency signal transmitted from the transmitter apparatus at a third frequency, and a fourth phase difference for a continuous-wave radio-frequency signal transmitted from the receiver apparatus at a fourth frequency, wherein the third and fourth frequencies are different from the first and second frequencies. The third and fourth frequencies may be separated by a second frequency offset, which may be the same as the first frequency offset or within 10% or 50% of the first frequency offset. The first and third frequencies may be respective carrier frequencies of an orthogonal-frequency-division-multiplexing (OFDM) communication protocol that the radio system is configured to use for communicating data between the radio transmitter apparatus and the radio receiver apparatus. The system may determine the distance by calculating a gradient, over frequency, of the sum of the first and second phase differences, and the sum of the third and fourth phase differences (and optionally the sum of further pairs of phase differences). The second frequency offset, and respective DC offsets, may be estimated by the same methods as used with the first and second signals.

The receiver preferably comprises an analog-to-digital converter (ADC). The down-mixed signal may comprise a sequence of sample values. The mixing may be performed digitally (e.g., direct RF conversion), or on analog signals.

Generating the frequency-offset data may comprise generating difference data representative of a difference signal comprising a sequence of differences between pairs of sample values of the down-mixed samples, wherein the sample values of each pair are separated by a common distance. The frequency offset may be estimated from the difference signal using a Kay's frequency estimator, or any other appropriate technique.

The DC-offset data may represent a maximum-likelihood estimate of the DC offset component of the down-mixed signal. The DC offset may be estimated by evaluating a DC-offset estimation function of the down-mixed signal and the estimated frequency offset. Estimating the DC offset may comprise evaluating a complex exponential function of the estimated frequency offset. The complex exponential function may be a natural exponential function. The exponent may be entirely imaginary and may be a linear function of time. The complex exponential function may be a term within the DC-offset estimation function.

While, in one set of embodiments, the DC offset estimation is used to reduce or remove DC offset from the same portion of the received signal from which the DC offset estimation is obtained, this is not essential, and, in another set of embodiments, the DC offset data may be used to reduce or remove DC offset from a different portion of the continuous-wave radio-frequency signal, or from a different radio-frequency signal. In some embodiments, the receiver apparatus may receive a radio signal encoding data, and may use the DC-offset data to compensate for a DC offset in the down-mixed data signal.

The continuous-wave radio-frequency (RF) signal may be a portion of a longer RF signal—e.g., a preamble to a data packet. The longer RF signal may contain data modulated on a carrier having the first frequency.

The radio receiver apparatus may support a version of the Bluetooth™ Low Energy protocol. The first frequency may be in the 2.4 GHz band.

The radio receiver apparatus may comprise or may be an integrated-circuit radio receiver—e.g., a silicon chip. It may comprise, or be connectable to, one or more off-chip components, such as a power supply, antenna, crystal, discrete capacitors, discrete resistors, etc. The radio receiver apparatus may also comprise a radio transmitter.

The radio receiver apparatus and radio transmitter apparatus may each comprise one or more processors, DSPs, logic gates, amplifiers, filters, digital components, analog components, non-volatile memories (e.g., for storing software instructions), volatile memories, memory buses, peripherals, inputs, outputs, and any other relevant electronic components or features.

In particular, a processor configured to generate the frequency-offset data and the DC-offset data may be so configured by software instructions stored in a memory of the apparatus. The processor may comprise a DSP and/or a general purpose processor, such an Arm™ Cortex-M™ processor. Generating the frequency-offset data and the DC-offset data may be performed wholly in software, or wholly by hardwired circuitry (e.g., comprising digital logic gates), or by a combination or software and hardware.

The radio receiver apparatus may be any apparatus or device, and may have other functions in addition to receiving and processing radio-frequency signals. It may, for instance, be a vehicle, or a cell phone, or wireless sensor device.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
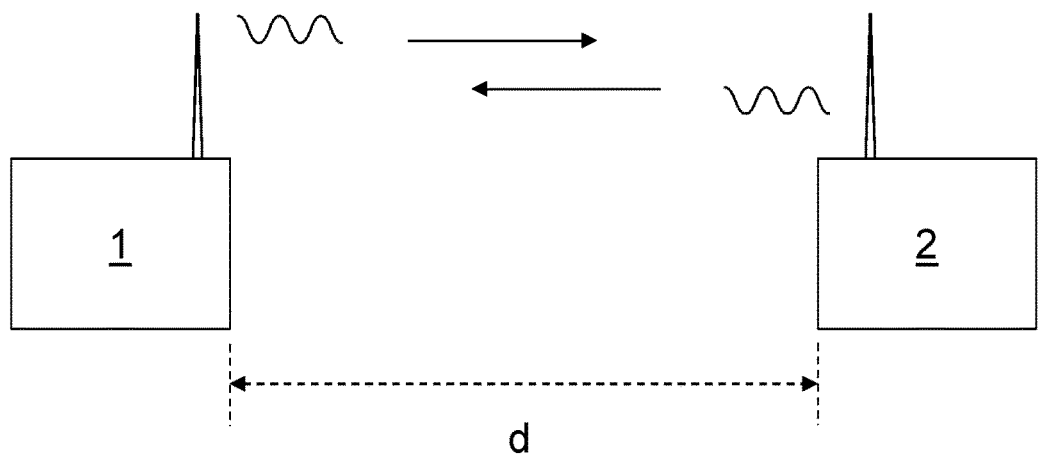
FIG. 1 is a schematic diagram of a radio communication system embodying the invention.

FIG. 1 shows a first radio transceiver device 1 and a second radio transceiver device 2. The devices 1, 2 could be any radio-equipped devices, such as smartphones, wireless sensors, household appliances, land vehicles, satellites, etc. In one set of embodiments, the devices 1, 2 are consumer electronics products, and can communicate with each other over a Bluetooth™ Low Energy communication link.

The devices 1, 2 are separated by a distance, d. This distance could be of the order of centimetres, metres, kilometres, tens of kilometres, hundreds of kilometres or more.

The devices 1, 2 are configured to measure the distance d using multicarrier phase-based ranging. Note that phase-based ranging is quite different from radar ranging, in which a radar device receives reflections of radio signals off a target. In phase-based ranging, radio waves are transmitted from a radio transmitter device and are received by a radio receiver device that is located away from the radio transmitter device.

The devices 1, 2 are not synchronized, but perform multicarrier phase-based ranging to estimate d. An initiator—e.g., the first device 1—first sends a continuous-wave (CW) radio signal that is an amplified version of a sine wave, of frequency $f_{i,LO}$, generated by its local oscillator (LO). This signal is then received by a responder—e.g., the second device 2—that has its LO set to a similar frequency, $f_{r,LO}$, (as explained in more detail below). The responder 2 measures a first phase difference between its LO and the incoming signal.

The initiator 1 and responder 2 then switch roles, and the responder 2 transmits a CW signal which is an amplified version of its local oscillator (LO)—i.e. a sine wave of frequency $f_{r,LO}$. This is then received by the initiator 1, which measures a second phase difference between the initiator's LO, set to the frequency $f_{i,LO}$, and the incoming signal. The LOs of both devices 1, 2 are kept constant during the two phases of the procedure.

Assuming no multipath interference, noise or other impairments, the sum $\psi_{ir}$ of the two phase differences is related to the distance, d, between the devices 1, 2 by $$\psi_{ir} \approx \frac{2\pi(f_{i,LO} + f_{r,LO})d}{c} - 2\pi\Delta f \, T + C \quad (1)$$

where $f_{i,LO}$ and $f_{r,LO}$ are the LO frequencies of the initiator 1 and responder 2 respectively, T is the time between phase measurements, Δf is the offset between the two LO frequencies, and C is a constant.

The frequency offset Δf contains two components: a first component, $f_{IF}$, is an intentional, predetermined offset (i.e. an intermediate mixing frequency), while a second component, $f_{error}$, is an unknown offset due to oscillator inaccuracies between the two devices 1, 2. I.e.

$$\Delta f = f_{IF} + f_{error}.$$

The two LO frequencies are thus related by $$f_{r,LO} = f_{i,LO} - \Delta f = f_{i,LO} - (f_{IF} + f_{error}).$$

By taking phase measurements over at least two different $f_{i,LO}$ frequencies (e.g., over a set of two or more Bluetooth™ Low Energy carrier frequencies), and calculating the gradient of $\psi_{ir}$ as a function of $f_{i,LO}$, the distance, d, can be estimated.

The responder 2 may transmit its phase measurements to the initiator 1, e.g., as data in one or more radio packets, and the initiator 1 may use these measurements to estimate the distance, d. Alternatively, the phase measurements could be sent to the responder 2, or to a third device, such as a network server, for performing the distance estimation.

Note that, if Δf=0, the time dependence would disappear. Correcting precisely for the cases where $f_{IF}\neq 0$ and $f_{error}\neq 0$ requires knowledge of T. This may be difficult to achieve accurately in the absence of modulated data to provide timing information, because the devices 1, 2 are not synchronous. Therefore it is desirable to minimize Lf so that the time dependence is sufficiently small that it can be disregarded while preserving a desired level of accuracy in the distance estimation.

However, the negative impact of DC offset on the ability to measure the phase increases as Δf reduces. If Δf=0, the DC offset can completely mask the received signal.

The present embodiments address this by setting an intentional non-zero frequency offset, $f_{IF}$, between the nominal frequencies of the receiver and transmitter local oscillators, and by seeking to minimise $f_{error}$, so as to provide a small, but non-zero, frequency offset Δf. This frequency offset may be of the order of 10 kHz—e.g., around kHz, 10 kHz, 20 kHz or so. The devices 1,2 between them estimate the actual frequency offset, Δf, including an error, and use this to estimate the DC offset instantaneously—i.e. while receiving the constant-wave signal—rather than requiring a separate DC-offset calibration phase. This approach therefore doesn't rely on the accuracy of an earlier-measured estimate of the DC offset measurement, and may therefore provide more accurate distance estimates.

Figure 2:
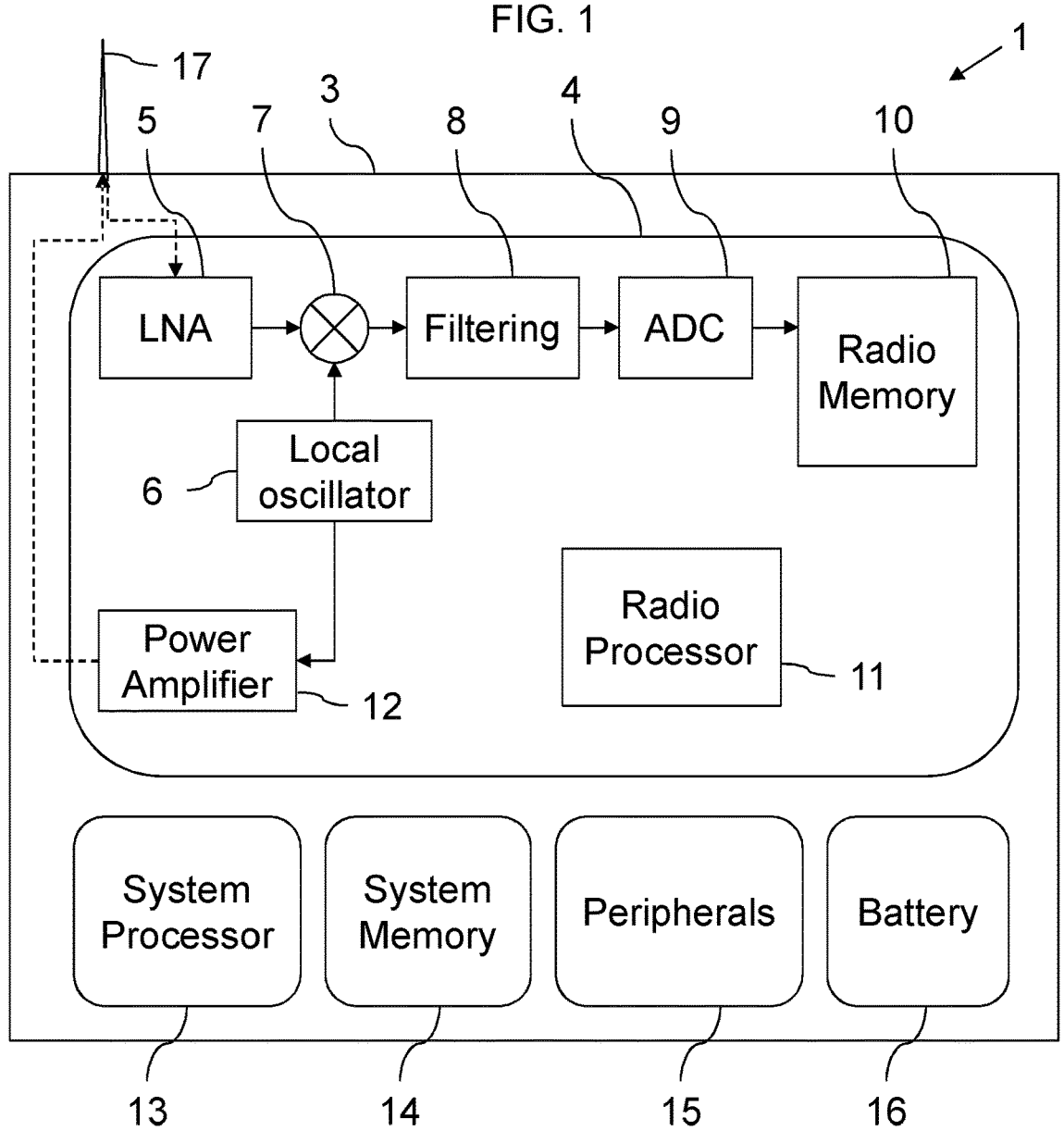
FIG. 2 is a schematic diagram of a radio receiver embodying the invention.

FIG. 2 provides more detail of some of the internal components of the initiator device 1 in an exemplary implementation. The responder device 2 may be similar.

The device 1 contains, within a housing 3, a radio microcontroller chip 4 that supports Bluetooth™ Low Energy communications. It may additionally or instead support other radio protocols such as IEEE 802.11, 3GPP LTE Cat-M1, 3GPP LTE NB-IoT, IEEE 802.15.4, Zigbee™, Thread™, ANT™, etc.

The radio chip 4 contains a low-noise amplifier (LNA) 5, a local oscillator (LO) 6, a quadrature mixer 7 for mixing an incoming signal with a periodic LO signal, receive-path filtering 8, an analog-to-digital converter (ADC) 9, radio memory 10 and a radio processor 11. On a transmit path, it contains a power amplifier (PA) 12, which can also receive the periodic LO signal from the local oscillator 6. The radio memory 10 may include volatile memory (e.g., RAM) and non-volatile memory (e.g., flash). The radio processor 11 may be a general purpose processor such as an Arm™ Cortex-M™ processor; it may also include one or more DSPs.

The device 1 may also contain a further system processor 13, system memory 14, peripherals 15 such as a temperature sensor or I/O modules, and a battery 16. A radio antenna 17 may be within or external to the housing 3 and is connected to the radio chip 4 by appropriate components. Of course, it will be appreciated that the device 1 may contain other elements, such as buses, crystals, digital logic, analog circuitry, discrete active components, discrete passive components, further processors, user interface components, etc. which are not shown here for the sake of simplicity. Further details of the transmit path, e.g. as used when transmitting encoded data, are also omitted here for simplicity. The device 1 may be a component of a larger device, such as a car, or it may be a standalone device.

In use, software stored in the radio memory 10 is executed by the radio processor 11 to perform a distance estimation process as disclosed herein. The processor 11 is able to set the frequency of the local oscillator 6 to different frequencies as required. The second device 2 contains complementary software for carrying out its part of the process. In other embodiments, some or all of the process may be carried out by hard-wired logic in the radio devices 1, 2. The resulting distance estimate, d, may be output to the system processor 13 for further use, or may be stored for use by the radio chip 4 itself.

Figure 3:
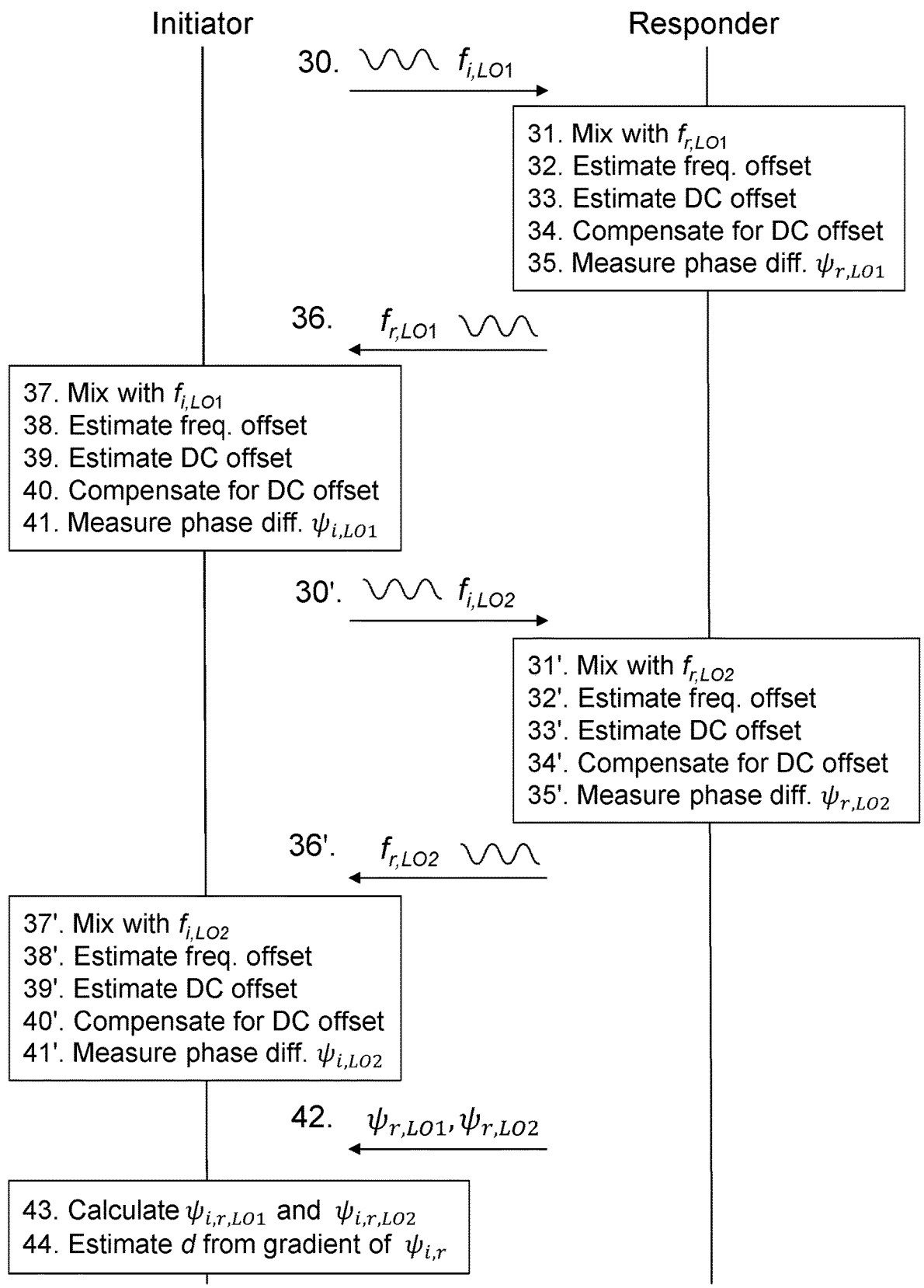
FIG. 3 is a flow chart of a DC offset estimation process embodying the invention.

FIG. 3 is a flowchart showing the main steps of the distance estimation process in one embodiment.

In a first phase, the initiator device 1 sets its local oscillator 6 to the frequency $f_{i,LO1}$ and transmits 30 a sinusoidal continuous-wave radio signal of frequency $f_{i,LO1}$. The responder device 2 mixes 31 the incoming signal with a signal from its local oscillator having a frequency $f_{r,LO1}$. The devices 1, 2 may be configured for an intended frequency offset $\Delta f = f_{i,LO1} - f_{r,LO1}$ of around 10 kHz. The responder device 2 estimates 32 the actual frequency offset, $\Delta f$, which may include an unknown error term, as explained in more detail below. It then estimates 33 a DC offset, as explained in more detail below. It then compensates 34 the sampled received signal to remove the estimated DC offset. Next, the responder device 2 measures 35 the phase difference $\psi_{r,LO1}$ between the compensated received signal and the locally-generated signal.

In a second phase, the respond device 2 keeps its local oscillator at $f_{r,LO1}$ and transmits 36 a sinusoidal continuous-wave radio signal of frequency $f_{r,LO1}$. The initiator device 1 mixes 37 the incoming signal with a signal from its local oscillator 6 which remains set at $f_{i,LO1}$. The initiator device 1 estimates 38 the frequency offset $\Delta f = f_{i,LO1} - f_{r,LO1}$ as explained in more detail below. It then estimates 39 a DC offset, as explained in more detail below. It then compensates 40 the sampled received signal to remove the estimated DC offset. Next, the initiator device 1 measures 41 the phase difference $\psi_{i,LO1}$ between the compensated received signal and the locally-generated signal.

These steps 30 to 41 are then repeated, in steps 30' to 41'. Both phases are the same, except that a different pair of local oscillator values, $f_{i,LO2}$, $f_{r,LO2}$, is used. The same intended frequency offset, $\Delta f$, may be used.

Although only two instances are shown in FIG. 3, the steps 30 to 41 may be performed any number of times, n, using different $f_{i,LO}$ values—e.g. n=2, 3, 5, 10 or more—depending on requirements.

Once sufficient phase differences have been collected, the responder device 2 transmits 42 all the phase differences it has measured, $\psi_{r,LO1}$, $\psi_{r,LO2}$, ..., $\psi_{r,LOn}$, to the initiator device 1, as data encoded in a data packet.

The initiator device 1 then sums 43 the two $\psi_{i,Lo}$, $\psi_{r,LO}$ values for each frequency pair to get $\psi_{r,LO1}$, $\psi_{r,LO2}$, ..., $\psi_{i,r,LOn}$. It then estimates 44 the separation distance, d, from the gradient of $\psi_{i,r}$ over frequency, according to equation (1) above.

Of course, many variations are possible. For example, the responder device 2 could transmit its frequency offset estimates to the initiator device 1, instead of the initiator device 1 calculating these independently (although, if there is a significant time delay between the sine wave transmissions 30, 31, it may be desirable for both devices 1, 2 to perform independent estimations).

The continuous-wave signals may be transmitted as elements within respective data packets, or they may be stand-alone transmissions.

Exemplary methods for estimating the frequency offset and the DC offset, according to some embodiments, will now be described.

System Model

Assume that a continuous wave is transmitted by the initiator 1 for a period of Tμs. Define c as the DC offset. The initial phase and amplitude of the incoming signal as seen at the output of an ADC of the responder 2 is a=b exp(iψ) where b>0 and ψ∈[0,2π). The frequency offset is $\Delta f$. N samples are collected at a sample rate $f_s$ with sampling period $T_s = 1/f_s$.

The sampled down-mixed signal at the output of the ADC, y, is given by $$y = c\mathbf{1} + an + v$$

where 1 is the N×1 vector containing only 1's, v is an N×1 vector of random complex noise, and n is the frequency rotation vector with elements $n_k = \exp(i2\pi\Delta f T_s k)$.

Algorithm

The algorithm proceeds by first obtaining an estimate of the frequency offset, and then solving for the DC offset.

Frequency Offset Estimation A frequency estimate may be obtained in the following fashion.

First, a difference signal, z, is generated as $$z_k = y_k - y_{k-D_1}$$

where $D_1$ is a positive integer.

This gives $$z_k = an_k - an_{k-D1} + v_k - v_{k-D1}$$
$$= a\exp(i2\pi\Delta f T_s k)[1 - \exp(-i2\pi\Delta f T_s D_1)] + v_k - v_{k-D1}$$

Note that the DC offset from the signal is removed in the difference signal, z, but the frequency offset is still present.

The frequency of this difference signal is measured by an appropriate method—for example, with a D-spaced Kay's frequency estimator. However, other options are possible, such as methods disclosed in "Frequency estimation by phase unwrapping", R. G. McKilliam, B. G. Quinn, B. Moran et al., IEEE Transactions on Signal Processing, vol. 58, no. 6, pp. 2953-2963, 2010.

Using a spacing of $D_2$, a series, w, is calculated as $$w_k = z_k z_{k-D_2}^*$$

Disregarding the noise term, $W_k$ is equal to $$\begin{aligned} w_k &= |a|^2 \exp(i2\pi\Delta f T_s k)[1 - \exp(-i2\pi\Delta f T_s D_1)] \exp(-i2\pi\Delta f T_s (k - D_2)) \\ &\quad [1 - \exp(-i2\pi\Delta f T_s D_1)]^* \\ &= |a|^2 |1 - \exp(-i2\pi\Delta f T_s D_1)| \exp(i2\pi\Delta f T_s k) \exp(-i2\pi\Delta f T_s (k - D_2)) \\ &= b \exp(i2\pi\Delta f T_s D_2) \end{aligned}$$

where b is a constant.

Therefore, the frequency offset is estimated as $$\Delta \hat{f} = \angle(\Sigma w_k)/(2\pi T_s D_2)$$

DC Offset Estimation

Assuming the noise $v_k$ is circularly symmetric complex Gaussian white noise, the maximum likelihood estimate of the DC offset, c, can be obtained using the frequency offset estimate $\Delta \hat{f}$.

Define $\hat{n}_k = \exp(i2\pi\Delta f T_s k)$. The log-likelihood function is given by $$L = \|y - c\mathbf{1} - a\hat{n}\|^2$$

After some manipulation it can be shown that $$\frac{\partial L}{\partial a^*} = -\hat{n}^*(y - c\mathbf{1}) + a\|\hat{n}\|^2$$

Solving for $$\frac{\partial L}{\partial a^*} = 0,$$

gives me maximum-likelihood estimate of the initial phase and amplitude, a, as $$\hat{a} = \frac{\hat{n}^*(y - c\mathbf{1})}{\|\hat{n}\|^2} = \frac{\hat{n}^*(y - c\mathbf{1})}{N}$$

Substituting $\hat{a}$ into L gives $$L = \left\|y - c\mathbf{1} - \frac{\hat{n}^*(y - c\mathbf{1})}{N}\hat{n}\right\|^2 = \left\|\left(I - \frac{\hat{n}\hat{n}^*}{N}\right)(y - c\mathbf{1})\right\|^2 = \|P(y - c\mathbf{1})\|^2$$

where I is the N×N identity matrix and $$P = I - \frac{\hat{n}\hat{n}^*}{N}$$

is a projection matrix.
Define $\tilde{y} = Py$ and $\tilde{\mathbf{1}} = P\mathbf{1}$.
Then $$\frac{\partial L}{\partial c^*} = -\tilde{\mathbf{1}}^*\tilde{y} + c\|\tilde{\mathbf{1}}\|^2$$

Solving for $$\frac{\partial L}{\partial c^*} = 0,$$

gives the maximum-likelihood estimate of the DC offset as $$\hat{c} = \frac{\tilde{\mathbf{1}}^*\tilde{y}}{\|\tilde{\mathbf{1}}\|^2} \quad (2)$$

Note that this does not require the devices 1, 2 to perform actual matrix computations involving P.
In practice the devices 1, 2 calculate $\tilde{y}$ and $\tilde{\mathbf{1}}$ as $$\tilde{y} = y - \frac{\hat{n}^*\hat{n}}{N}y,$$

and $$\tilde{\mathbf{1}} = \mathbf{1} - \frac{\hat{n}^*\hat{n}}{N}\mathbf{1}$$

which they input to equation (2), above, to determine an estimate, $\hat{c}$, of the DC offset.

Phase Estimation

Once the DC offset has been estimated, the device 1, 2 can simply subtract the contribution to the sampled signal, $y_k$, arising from the device's own local oscillator, and can then determine the phase difference of the incoming signal.

This can be done by calculating $\hat{y}$ using the formula $$\hat{y} = y - \hat{c}\mathbf{1} = (c - \hat{c})\mathbf{1} + an + v$$

and obtaining a phase estimate, $\hat{\psi}$, by taking the complex argument of the average of the values of $\hat{y}$, i.e.

$$\hat{\psi} = \arg\{\mathbf{1}^*\hat{y}\}$$

Simulations

Figure 4:
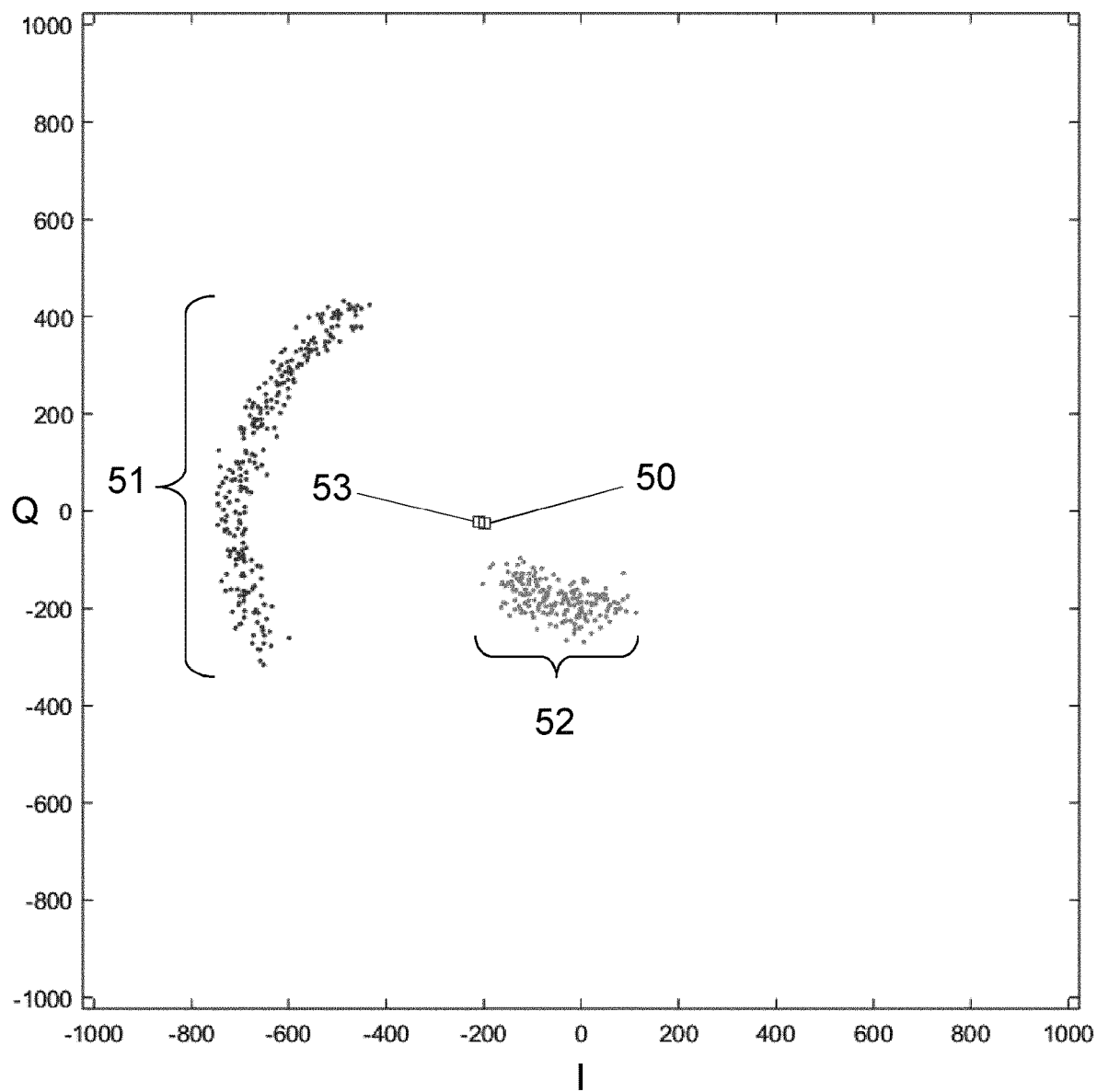
FIG. 4 is an I-Q phase diagram showing outputs from a simulation of the DC offset estimation process.

FIG. 4 shows results of a simulation using the methodology for joint estimation of the DC offset and frequency offset as disclosed above.

In this simulation, a measurement of a received continuous-wave was made over a period of 32 µs. A sample rate of 8 MHz was employed (i.e., ~256 samples in total). A value of $D_1=D_2=64$ was used, so that $D_1 T=D_2 T=8$ µs, where T is the sample period of 0.125 µs. The ADC range was −1023 to 1023. The received amplitude |a| was 511.5 (representing automatic gain control). The phase of a and the DC offset c were both randomly chosen from the range [0, 2π). The amplitude of the DC offset was chosen from a uniform distribution with amplitude [0, 511.5). Complex Gaussian noise was added with a real and imaginary standard deviation of ~20.

FIG. 4 shows an example output of the algorithm under a simulated scenario in which the local oscillator is offset from the frequency of the received signal by 7.80 kHz. In this simulation run, the actual DC offset was randomly selected to equal −199−25i. This is represented in FIG. 4 by a point 50.

The graph also shows an arced cluster of points 51 which represent the received down-mixed signal, at the output of the ADC, at different sample times, under the presence of simulated Gaussian random noise. Over the 32 µs time frame, these samples cover a quarter rotation of the unit circle.

A further cluster of points 52 represents the difference signal, $z_k$, calculated as described above, in which the DC offset has been removed but the frequency offset is still present.

The frequency offset estimate obtained from the difference signal in this simulation, using the algorithm described above, was 7.96 kHz. This represents an accuracy of approximately 160 Hz.

The graph also includes a point 53 representing the estimated DC offset, calculated as described above. This was estimated as having the value −211−22i using the algorithm disclosed above. This represents an accuracy of approximately 6% in the DC offset estimation.

Thus, with only a quarter cycle of the down-mixed signal, the DC offset can be estimated with an accuracy of ~6%. This demonstrates that this method can enable rapid and accurate estimation of DC offset.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A radio-frequency reception method comprising:
 receiving a continuous-wave radio-frequency signal having a first frequency;
 generating a periodic signal at a second frequency which differs from the first frequency by a frequency offset;
 mixing the received radio-frequency signal with the periodic signal to generate a down-mixed signal;
 processing the down-mixed signal to generate frequency-offset data representative of an estimate of the frequency offset; and
 processing the frequency-offset data to generate DC-offset data, representative of an estimate of a DC offset component of the down-mixed signal, from the frequency-offset data; wherein the DC-offset data represents a maximum-likelihood estimate of the DC offset component of the down-mixed signal.

2. The radio-frequency reception method of claim 1, further comprising using the DC-offset data to reduce or remove a DC offset component from the down-mixed signal.

3. The radio-frequency reception method of claim 1, wherein the frequency offset is in the range 5 kHz to 100 kHz.

4. The radio-frequency reception method of claim 1, wherein the frequency offset comprises a predetermined intermediate-frequency component and an error component, and wherein the predetermined intermediate-frequency component is around 10 kHz or is in the range 5 kHz to 100 kHz.

5. The radio-frequency reception method of claim 1, comprising processing at most one cycle period of the down-mixed signal to generate the frequency-offset data and the DC-offset data.

6. The radio-frequency reception method of claim 1, further comprising generating phase-difference data representative of a phase difference between the received continuous-wave radio-frequency signal and the generated periodic signal.

7. The radio-frequency reception method of claim 6, further comprising using the phase-difference data to determine a distance a transmitter of the continuous-wave radio-frequency signal and a receiver of the continuous-wave radio-frequency signal.

8. The radio-frequency reception method of claim 1, wherein generating the frequency-offset data comprises generating difference data representative of a difference signal comprising a sequence of differences between pairs of sample values of the down-mixed signal, wherein the sample values of each pair are separated by a common distance.

9. A radio receiver apparatus comprising:
 an electrical input for receiving a continuous-wave radio-frequency signal having a first frequency;
 a local oscillator for generating a periodic signal at a second frequency which differs from the first frequency by a frequency offset;
 a mixer for mixing the received continuous-wave radio-frequency signal with the periodic signal to generate a down-mixed signal; and
 a processor or other circuitry configured to generate frequency-offset data from the down-mixed signal, wherein the frequency-offset data is representative of an estimate of the frequency offset, and configured to process the frequency-offset data to generate DC-offset data, representative of an estimate of a DC offset component of the down-mixed signal, from the frequency-offset data;
 wherein the DC-offset data represents a maximum-likelihood estimate of the DC offset component of the down-mixed signal.

10. The radio receiver apparatus of claim 9, wherein the processor or other circuitry is further configured to use the DC-offset data to reduce or remove a DC offset component from the down-mixed signal.

11. The radio receiver apparatus of claim 9, wherein the processor or other circuitry is further configured to process at most one cycle period of the down-mixed signal to generate the frequency-offset data and the DC-offset data.

12. The radio receiver apparatus of claim 9, wherein the processor or other circuitry is further configured to generate phase-difference data representative of a phase difference between the received continuous-wave radio-frequency signal and the generated periodic signal.

13. The radio receiver apparatus of claim 12, wherein the processor or other circuitry is further configured to use the phase-difference data to determine a distance between the radio receiver apparatus and a transmitter of the continuous-wave radio-frequency signal.

14. The radio receiver apparatus of claim 9, wherein the processor or other circuitry is configured to generate the frequency-offset data by generating difference data representative of a difference signal comprising a sequence of differences between pairs of sample values of the down-mixed signal, wherein the sample values of each pair are separated by a common distance.

15. A radio system comprising a radio transmitter apparatus and a radio receiver apparatus, wherein the radio transmitter apparatus is configured to transmit a continuous-wave radio-frequency signal having a first frequency, and wherein the radio receiver apparatus comprises:
   an antenna for receiving the continuous-wave radio-frequency signal;
   a local oscillator for generating a periodic signal at a second frequency which differs from the first frequency by a frequency offset;
   a mixer for mixing the received continuous-wave radio-frequency signal with the periodic signal to generate a down-mixed signal; and
   a processor or other circuitry configured to generate frequency-offset data from the down-mixed signal, wherein the frequency-offset data is representative of an estimate of the frequency offset, and configured to process the frequency-offset data to generate DC-offset data, representative of an estimate of a DC offset component of the down-mixed signal, from the frequency-offset data;
wherein the DC-offset data represents a maximum-likelihood estimate of the DC offset component of the down-mixed signal.

16. The radio system of claim 15, wherein the frequency offset is in the range 5 kHz to 100 kHz.

17. The radio system of claim 15, wherein:
   the radio transmitter apparatus comprises a transmitter crystal oscillator, having a nominal transmitter oscillator frequency, and transmitter local-oscillator circuitry configured to generate a transmitter local-oscillator signal from the transmitter crystal oscillator;
   the radio receiver apparatus comprises a receiver crystal oscillator, having a nominal receiver oscillator frequency, and receiver local-oscillator circuitry configured to generate a receiver local-oscillator signal from the receiver crystal oscillator; and
   the transmitter local-oscillator circuitry and the receiver local-oscillator circuitry are configured so that the transmitter local-oscillator signal and the receiver local-oscillator signal are offset by a frequency offset in the range 5 kHz to 100 kHz when the transmitter crystal oscillator oscillates at the transmitter oscillator frequency and when the receiver crystal oscillator oscillates at the receiver oscillator frequency.

18. The radio system of claim 15, configured to generate phase-difference data representative of a phase difference between the received continuous-wave radio-frequency signal and the generated periodic signal, and to use the phase-difference data to determine a distance between the radio transmitter apparatus and the radio receiver apparatus.

* * * * *